US011875285B2

(12) United States Patent
Yuan et al.

(10) Patent No.: US 11,875,285 B2
(45) Date of Patent: Jan. 16, 2024

(54) METHOD FOR SCHEDULING RESOURCE-CONSTRAINED PROJECT BY INVASIVE WEED OPTIMIZATION

(71) Applicant: Guangzhou Metro Design & Research Institute Co., Ltd., Guangzhou (CN)

(72) Inventors: Quan Yuan, Guangzhou (CN); Wenqu Zeng, Guangzhou (CN); Haiou Shi, Guangzhou (CN); Xingzhong Nong, Guangzhou (CN); Jian Wang, Guangzhou (CN); Yunlin Zhang, Guangzhou (CN)

(73) Assignee: Guangzhou Metro Design & Research Inst. Co. Ltd., Guangdong (CN)

( * ) Notice: Subject to any disclaimer, the term of this patent is extended or adjusted under 35 U.S.C. 154(b) by 839 days.

(21) Appl. No.: 16/966,849

(22) PCT Filed: Jun. 23, 2020

(86) PCT No.: PCT/CN2020/097665
§ 371 (c)(1),
(2) Date: Jul. 31, 2020

(87) PCT Pub. No.: WO2021/212649
PCT Pub. Date: Oct. 28, 2021

(65) Prior Publication Data
US 2023/0153708 A1    May 18, 2023

(30) Foreign Application Priority Data

Apr. 20, 2020   (CN) .......................... 202010310920.9

(51) Int. Cl.
*G06F 9/46* (2006.01)
*G06Q 10/0631* (2023.01)
(Continued)

(52) U.S. Cl.
CPC ..... *G06Q 10/06311* (2013.01); *G06F 9/5038* (2013.01); *G06N 3/006* (2013.01); *G06F 9/4887* (2013.01)

(58) Field of Classification Search
None
See application file for complete search history.

(56) References Cited

FOREIGN PATENT DOCUMENTS

| CN | 107063240 A | 8/2017 |
| CN | 107656251 A | 2/2018 |

(Continued)

OTHER PUBLICATIONS

Li et al; A Dag Task Scheduling Scheme on Heterogeneous Computing Systems Using Invasive Weed Optimization Algorithm; IEEE 2014 (Year: 2014).*

(Continued)

*Primary Examiner* — Bing Zhao
(74) *Attorney, Agent, or Firm* — Weber Rosselli & Cannon LLP

(57) ABSTRACT

Provided is a method for scheduling resource-constrained project by IWO. The method establishes a resource-constrained project scheduling model first, converts the project scheduling issue in actual engineering into the combination and optimization in a mathematical model, then the optimization aims at minimizing the project total duration, while considering the immediate predecessor/successor constraints of the project activities and a variety of renewable resource constraints, to construct project scheduling model, lastly IWO is used to seek the solution for large-scale project scheduling. In the solution process, a right-shift decoding strategy was designed to rectify the ineligible solutions that occurred during the generation of weed seeds, ensure that all solutions are in compliance with the immediate predecessor/successor constraints of the project activities, and improve (Continued)

the efficiency of algorithm. Solution efficiency. The resource-constrained project scheduling scheme of the present invention can effectively shorten the total construction period of large-scale project.

1 Claim, 2 Drawing Sheets

(51) Int. Cl.
*G06N 3/006* (2023.01)
*G06F 9/50* (2006.01)
*G06F 9/48* (2006.01)

(56) References Cited

FOREIGN PATENT DOCUMENTS

| CN | 109038545 A | 12/2018 | |
|---|---|---|---|
| CN | 109298747 A | 2/2019 | |
| CN | 110991056 B * | 8/2021 | ............ G06N 3/126 |

OTHER PUBLICATIONS

Maghsoudlou et al; A multi-objective invasive weeds optimization algorithm for solving multi-skill multi-mode resource constrained project scheduling problem; Computer and Chemical Engineering 88 (2016) p. 157-169 (Year: 2016).*
A.R. Mehrabian et al, "A novel numerical optimization algorithm inspired from weed colonization", Ecological Informatics, Oct. 5, 2006, vol. 1, Issue 4, pp. 355-366.

* cited by examiner

METHOD FOR SCHEDULING RESOURCE-CONSTRAINED PROJECT BY INVASIVE WEED OPTIMIZATION

CROSS-REFERENCE TO RELATED APPLICATIONS

This application claims priority to PCT Application No. PCT/CN2020/097665, having a filing date of Jun. 23, 2020 based on Chinese application No. 202010310920.9 having a filing date of Apr. 20, 2020, the entire contents of foresaid documents are hereby incorporated by reference.

TECHNICAL FIELD

The following relates to the field of construction project scheduling.

BACKGROUND OF INVENTION

Construction project involves not only many entities, e.g. proprietors, general contractor, design institutes, construction enterprises, operation maintenance organization during the design and construction process, but also dozens of professional aspects in relation to the design and implementation of construction, structure, ventilation, water supply and drainage, safety control, geology condition and so on. Massive information can be generated in design drawings, construction and operation maintenance among the entities and professional aspects. Although the information can be obtained through the BIM system, each entity may only involve the limited resource apart from their professional aspect, and the dynamical information brings challenges to the resource allocation and scheduling in each sub-project and its activities. It is often necessary to re-schedule each sub-project and its activities constantly based on the information. In view of the entirely massive scale schedule due to the number of sub-projects and activities, the conventional solution of scheduling resource-constrained project is thereby challenged in terms of efficiency and accuracy, and an effective solution of scheduling resource-constrained project is needed to improve the overall efficiency of the project.

The resource-constrained project scheduling has been proved to be a complex and strong non-deterministic polynomial-time hard (NP-hard) problem. From the solution point of view, the algorithms for solving the Resource Constrained Project Scheduling Problem (RCPSP) and its extended problems have three categories including an exact algorithm, a heuristic algorithm, and meta-heuristic algorithm (intelligent algorithm). Although the exact algorithm can obtain theoretically optimal solutions, it applies to small-scale solution only, whereas an approximate algorithm is initially applied to solve large-scale RCPSP problems. Since the scheduling scheme was proposed in 1963, various heuristic algorithms have been applied to the problems, but they have no optimal abilities and there were always no satisfactory solutions due to the affect from the problem itself. The meta-heuristic algorithms and intelligent algorithms were utilized to develop the solution in problem, for example, Simulated Annealing (SA) in local search is introduced to solve RCPSP problems, and the evolutionary algorithm (e.g. Genetic Algorithm, GA) and the swarm intelligence algorithm (e.g. Ant Colony Optimization, ACO) have been widely used in solving RCPSP problems.

Invasive Weed Optimization (IWO) is a novel, simple and effective numeric optimization algorithm, which was proposed by Lucas and Mehrabian in 2006. The algorithm was inspired by the aggressive propagation of weeds. Its optimization process simulates the colonization process of weeds and is highly robust, adaptive and random. The researches have shown that the IWO has excellent performance in solving large-scale scheduling problems. However, for the problem of project scheduling, the IWO is unable to avoid the ineligible solutions in the process of generating seeds, resulting in a low efficiency of the algorithm. In view of this problem, the present invention discloses a right-shift decoding strategy to rectify the ineligible solutions that occurred in the process of generating weeds seed, and to improve the efficiency of algorithm while ensuring the optimization effect, realizing IWO for solution of scheduling resource-constrained project, a large-scale resource-constrained project in particular.

SUMMARY OF THE INVENTION

An aspect relating to a method for scheduling resource-constrained project by IWO, this method can avoid the ineligible solutions in the resource-constrained project scheduling.

The method for scheduling resource-constrained project by IWO, according to the present invention, comprises the following processes:

1. Establishing a mathematical model for optimizing the resource-constrained project scheduling.

The research for the resource-constrained project scheduling problem is how to optimize the scheduling of certain management objectives in the projects containing variously constrained activities in immediate predecessor/successor sequence in the condition of constrained resource, the details are as follows:

Firstly, a project is supposed to be comprised of a set of activities J={0, 1, 2, . . . , n+1}, wherein the activities 0 and n+1 in this set are dummy activities, and represent the beginning and end of the project only without relating to the time and resources; j denotes a certain activity in the set, apart from the dummy activities, j∈J, $P_j$ denotes a set of immediate predecessor activities of j, and $S_j$ denotes a set of immediate successor activities of j; $t_j$ denotes the time duration of activity j, $st_j$ denotes the start time of the activity j; the project requires k kinds of resources, q denotes one of these resources, $r_{jq}$ denotes the demand amount for the resource q in unit time in the activity j, $b_q$ is maximum supply of the resource q in unit time; the time duration of project can be discretized, e.g. d={1, 2, . . . , T} where d is the timing of the discretized time duration, and T is the total time period of project; $A_d=\{j|st_j<d\leq st_j+t_j\}$ where $A_d$ is the set of activities that are being executed at the timing d;

Secondly, the mathematical model for optimizing the resource-constrained project scheduling can be established below on the basis of the above assumption.

$$\min T = st_{n+1} \quad (1)$$

$$x_{jd} = \begin{cases} 1, \text{ activity } j \text{ is in an action state at timing } d \\ 0, \text{ activity } j \text{ is in an inaction state at timing } d \end{cases} \quad (2)$$

-continued $$\sum_{d=1}^{T} x_{jd} = t_j, \forall j \in J \qquad (3)$$

$$t_j x_{jd} - t_j x_{j(d+1)} + \sum_{i=d+2}^{T} x_{ji} \le t_j, \forall j \in J, \forall d \in [1, 2, \ldots, T] \qquad (4)$$

$$t_0 = t_{n+1} = 0 \qquad (5)$$

$$r_{0q} = r_{(n+1)q} = 0, q = 1, 2, \ldots, k \qquad (6)$$

$$st_i + t_i \le st_j, \forall i \in P_j, \forall j \in J \qquad (7)$$

$$\sum_{j \in A_d} r_{jp} \le b_q, q = 1, 2, \ldots, k, \forall j \in J, \forall d \in [1, 2, \ldots, T] \qquad (8)$$

Where

Equation (1) is the objective function, i.e. the minimized time period of project;

Equation (2) is the decision variable;

Equation (3) expresses that each activity must be completed within a specified duration;

Equation (4) expresses that, once activity j started, it cannot be interrupted before completion;

Equations (5) and (6) express that the duration and resource demand are zero in the dummy activities 0 and n+1;

Equation (7) expresses the immediate predecessor/successor constraints, activity j can be initiated after all of these immediate predecessor activities were completed;

Equation (8) expresses a resource constraint, and the demand for a certain resource in all activities being running at the timing d is no more than the maximum supply of the resource in unit time.

2. The method for optimizing the solution by IWO is as follows:

Step 1: Setting parameters.

Setting initial population size $Q_{size}$, maximum population number $Q_{max}$, maximum seed number $S_{max}$, minimum seed number $S_{min}$, initial standard deviation $\sigma_{init}$, final standard deviation $\sigma_{final}$, maximum iteration number $iter_{max}$ and non-linear harmonic index N.

Step 2: Initializing population.

Initializing the weed population, wherein each individual weed includes a first code layer and a second code layer; the first code layer includes n+1 decimals between 0 and 1 that are generated randomly, to form a position code denoting the position of the weed; the second code layer includes a plurality of numbers denoting the sequence of activities, where each number corresponds to the sequence position of each decimal, as all the decimals are sequenced from small to large, such that all of these numbers become an activity sequence; the process of converting the position code in the first code layer to the activity sequence in the second code layer is called a conversion; each activity sequence, which corresponds to an individual weed, is a feasible solution for project scheduling, and its corresponding position code in the first code layer denotes the position of the feasible solution; meanwhile, as there are the immediate predecessor/successor constraints between the project activities, it is necessary to adjust the generated activity sequence through the right-shift decoding strategy and make it become the eligibly feasible solution in compliance with the immediate predecessor/successor constraints, using the following ways:

Starting from the first position on the activity sequence, determine whether there is an immediate predecessor activity in the sequence after the activity. If not, it means that the immediate predecessor/successor activities have ended, thereby this activity can be initiated, and the position denoted by the sequence number in the activity sequence is unchanged. If there is an immediate predecessor activity in the sequence after this activity, it means that the immediate predecessor activities of this activity have not yet ended, thereby this activity cannot be initiated, and its sequence number needs to move backward to the last position of the sequence; then continuing such determination for all activities in the sequence, until an complete activity sequence that meets the immediate predecessor or successor constraints is obtained, and such activity sequence is an eligible feasible solution for the project. Therefore, the initial weed population is formed by $Q_{size}$ weed individuals that generated by the above-mentioned population initialization operation and meet the eligible feasible solution.

Step 3: Executing an iteration of the weed population, and calculating the fitness value of the weed.

Multiplying the reciprocal of the objective function (1/T) by the coefficient C as the fitness function Fitness, i.e. Fitness=C/T, C is a constant, to calculate the fitness value of all weed individuals in the population.

Step 4. Calculating the number of seeds propagated by each individual weed in the population, and update the standard deviation of this iteration.

The number of seeds, weed, produced in the reproduction process of each individual weed is proportional to the fitness value f of the weed, the equation is as follows:

$$\text{weed} = \frac{f - f_{min}}{f_{max} - f_{min}}(s_{max} - s_{min}) + s_{min} \qquad (9)$$

Where $f_{max}$ is the maximum value of the fitness value of weeds in the population, and $f_{min}$ is the minimum value of the fitness value of weeds in the population;

The seeds produced by weed propagation are spread around the weeds by a normal distribution with a mean value of 0 and a standard deviation of $\sigma$. The distance between the seed and the weed is called a random step D=[$-\sigma$, $\sigma$]. $\sigma$ varies continuously as the iteration progresses, and its equation is as follows:

$$\sigma = \frac{(iter_{max} - iter)^N}{(iter_{max})^N}(\sigma_{init} - \sigma_{final}) + \sigma_{final} \qquad (10)$$

Where, iter is the current number of executed iterations of the weed population.

Step 5: Generating seeds through weed propagation, subsequently new weed populations are formed by merging weeds from the generated seeds with the original weed population.

Firstly, the number of seeds, weed, and the related the standard deviation normal distribution $\sigma$, that are generated by the weed propagation, are calculated by equations (9) and (10). A new position obtained in the solution is called the seed, whose position code is the seed position code, that is, the seed position code can be obtained according to the weed position code and the random step length D; then performing the same operation in the step 2, converting the seed position codes to the activity sequence, performing a right-shift decoding to make the activity sequence become the eligibly feasible solution, thereby the seed grows into a weed; in the meantime, the seed position code becomes a weed position code, this code, together with the sequence of activities after the right-shift decoding, constitute the first and second code layers for a new individual weed; lastly merging all weeds from the seeds with the original weed population to obtain a new weed population.

Step 6. Adjusting whether the size of the weed population is greater than $Q_{max}$. If so, go to step 7; otherwise, go to step 3.

Step 7. Calculating the fitness value of the weeds in the population and selecting $Q_{size}$ individuals pursuant to the principle of "struggle for existence".

With the propagation of weeds, when the size of weed population exceeds the capacity of the environment, it is necessary to determine the maximum size of weed population in order to restrict the propagation of weeds, and retain elite weed individuals while eliminate the others through the criteria of survival of the fittest, then select $Q_{size}$ weed individuals having high fitness value to form a new population.

Step 8. Determining whether the number of iterations equal to $iter_{max}$. If so, output the optimal solution and end the calculation; otherwise, go to step 3 to execute a new iteration process.

The present invention has the following benefits compared to the prior art.

1. As the limitation of the IWO optimization, IWO has not currently been applied to the field of project scheduling. This present invention improves the algorithm encoding and decoding method, and applies IWO to seek the solution of scheduling resource-constrained project. The present invention has obvious optimization effect, and certain advantages over other intelligent algorithms, especially when the project size increases.

2. The present invention establishes a right-shift decoding strategy, and avoids the ineligible solutions in the resource-constrained project scheduling, whereas the current method is usually to discard the ineligible solutions directly until the eligible solution appears when dealing with such problem in the prior art. The method according to the present invention improves the efficiency of algorithm greatly and makes the algorithm simple and feasible.

DETAILED DESCRIPTION OF THE INVENTION

Figure 1:
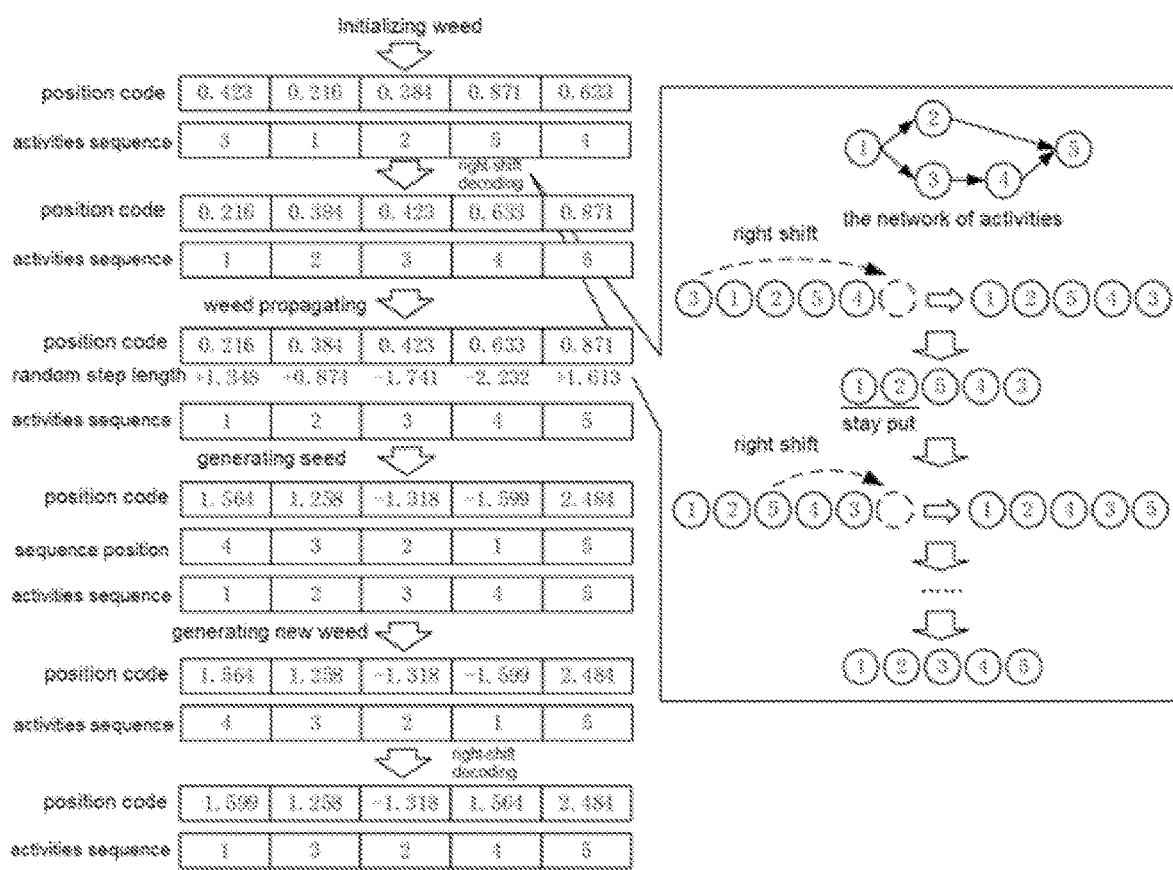
FIG. 1 shows the propagation process of weeds according to the present invention.
Figure 2:
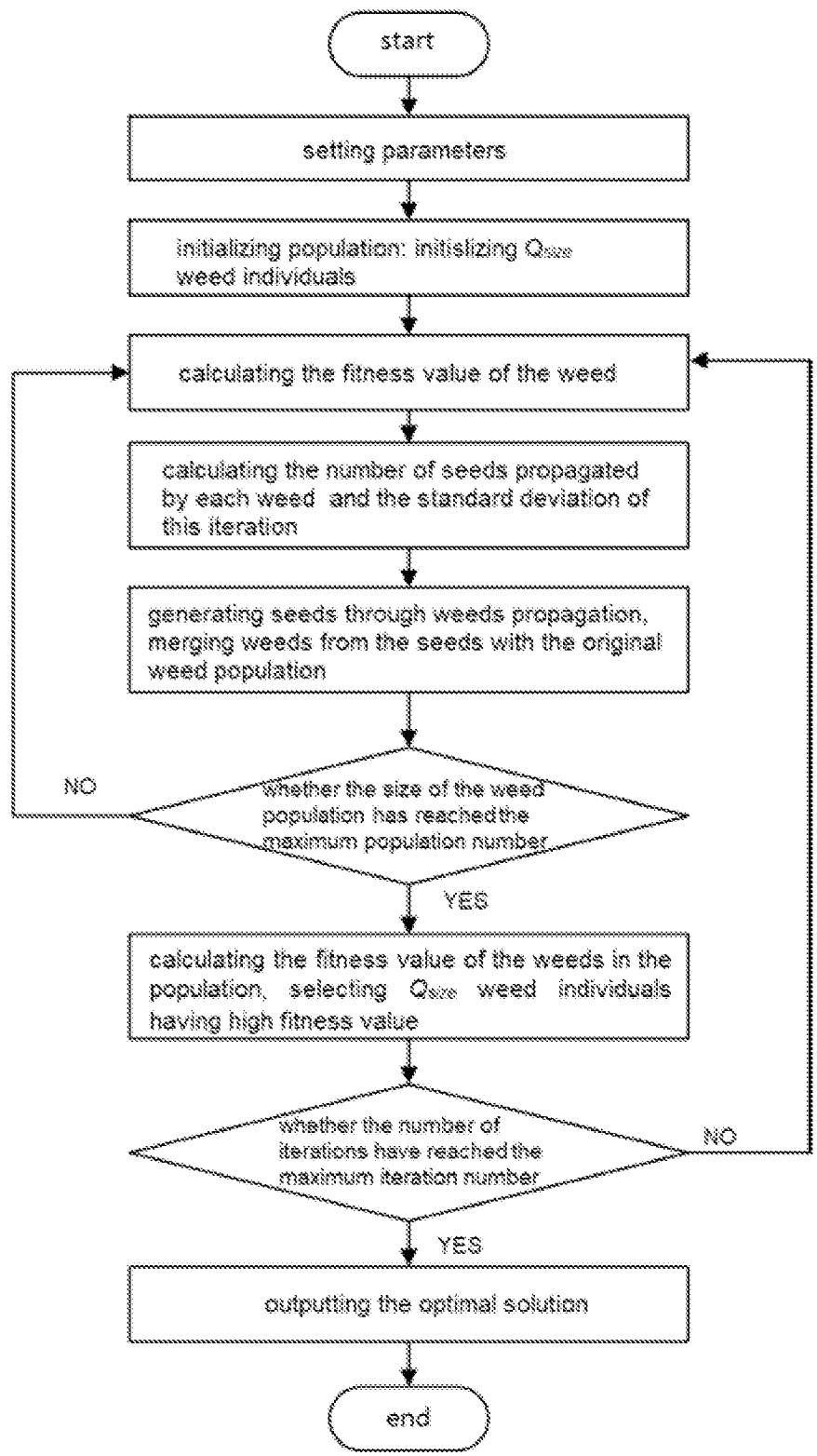
FIG. 2 is a flow chart of IWO according to the present invention.

Some examples in Project Scheduling Problem Library (PSPLIB) are utilized, and 5 sets of initial input data, in 4 working conditions that have 30, 60, 90, 120 activities respectively, are selected here randomly. This project in PSPLIB involves four kinds of renewable resources. Each activity has a certain demand for one or more resources in unit time, and each resource has a maximum supply in unit time.

Embodiment

1. Determining the description and assumption for the resource-constrained project scheduling problem, and establishing a mathematical model for optimizing the resource-constrained project scheduling.

The research for the resource-constrained project scheduling problem is how to optimize the scheduling of certain management objectives in the projects containing variously constrained activities in immediate predecessor/successor sequence in the condition of constrained resource, the details is as follows:

Firstly, a project is supposed to be comprised of a set of activities J={0, 1, 2, . . . , n+1}, wherein the activities 0 and n+1 in this set are dummy activities, and represent the beginning and end of the project only without relating to the time and resources; j denotes a certain activity in the set, apart from the dummy activities, j∈J, $P_j$ denotes a set of immediate predecessor activities of j, and $S_j$ denotes a set of immediate successor activities of j; t; denotes the time duration of activity j, $st_j$ denotes the start time of the activity j; the project requires k kinds of resources, q denotes one of these resources, $r_{jq}$ denotes the demand amount for the resource q in unit time in the activity j, $b_q$ is maximum supply of the resource q in unit time; the time duration of project can be discretized, e.g. d={1, 2, . . . , T} where d is the timing of the discretized time duration, and T is the total time period of project; $A_d$={j|$st_j$<d≤$st_j$+$t_j$} where $A_d$ is the set of activities that are being executed at the timing d;

Secondly, the mathematical model for optimizing the resource-constrained project scheduling can be established below on the basis of the above assumption.

$$\min T = st_{n+1} \quad (1)$$

$$x_{jd} = \begin{cases} 1, \text{ activity } j \text{ is in an action state at timing } d \\ 0, \text{ activity } j \text{ is in an inaction state at timing } d \end{cases} \quad (2)$$

$$\sum_{d=1}^{T} x_{jd} = t_j, \forall j \in J \quad (3)$$

$$t_j x_{jd} - t_j x_{j(d+1)} + \sum_{i=d+2}^{T} x_{ji} \le t_j, \forall j \in J, \forall d \in [1, 2, \ldots, T] \quad (4)$$

$$t_0 = t_{n+1} = 0 \quad (5)$$

$$r_{0q} = r_{(n+1)q} = 0, q = 1, 2, \ldots, k \quad (6)$$

$$st_i + t_i \le st_j, \forall i \in P_j, \forall j \in J \quad (7)$$

$$\sum_{j \in A_d} r_{jp} \le b_q, q = 1, 2, \ldots, k, \forall j \in J, \forall d \in [1, 2, \ldots, T] \quad (8)$$

Where

Equation (1) is the objective function, i.e. the minimized time period of project;

Equation (2) is the decision variable;

Equation (3) express that each activity must be completed within a specified duration;

Equation (4) express that, once activity j started, then it cannot be interrupted before completion;

Equations (5) and (6) express that the duration and resource demand are zero in the dummy activities 0 and n+1;

Equation (7) express the immediate predecessor/successor constraint, activity j must be initiated after all of its immediate predecessor activities were completed;

Equation (8) express a resource constraint, and the demand for a certain resource in all activities being running at the timing d is no more than the maximum supply of the resource in unit time.

According to the examples selected from PSPLIB, the initial data in the four working conditions, i.e. n=30, n=60, n=60 and n=90, is input to the Equations (1)-(8). In addition to data n, the data also comprises the time duration $t_j$ of each activity, the immediate predecessor activities set $P_j$, the immediate successor activities set $S_j$, the resource demand $r_{jq}$ per unit time and the maximum supply $b_q$ of each resource per unit time, thereby a complete mathematical model for the certain example to optimize the resource-constrained project scheduling can be obtained.

2. The method for optimizing the solution by IWO is as follows:

Step 1: Setting parameters.

Setting initial population size $Q_{size}$=5, maximum population number $Q_{max}$=20, maximum seed number $S_{max}$=10, minimum seed number $S_{min}$=0, initial standard deviation $\sigma_{init}$=100, final standard deviation $\sigma_{final}$=0.01, maximum iteration number $iter_{max}$=50, non-linear harmonic index N=3.

Step 2: Initializing population.

Initializing the weed population, wherein each individual weed includes a first code layer and a second code layer. The first code layer includes n+1 decimals between 0 and 1 that are generated randomly, to form a position code denoting the position of the weed. The second code layer includes a plurality of numbers denoting the sequence of activities, where each number corresponds to the sequence position of each decimal, as all the decimals are sequenced from small to large, such that all of these numbers become an activity sequence. The process of converting the position code in the first code layer to the activity sequence in the second code layer is called a conversion; each activity sequence, which corresponds to an individual weed, is a feasible solution for project scheduling, and its corresponding position code in the first code layer denotes the position of the feasible solution. Meanwhile, as there are the immediate predecessor/successor constraints between the project activities, it is necessary to adjust the generated activity sequence through the right-shift decoding strategy, to make it become the eligibly feasible solution in compliance with the immediate predecessor/successor constraints, using the following ways:

Starting from the first position on the activity sequence, determine whether there is an immediate predecessor activity in the sequence after the activity. If not, it means that the immediate predecessor/successor activities have ended, thereby this activity can be initiated, and the position denoted by the sequence number in the activity sequence is unchanged. If there is an immediate predecessor activity in the sequence after this activity, it means that the immediate predecessor activities of this activity have not yet ended, thereby this activity cannot be initiated, and its sequence number needs to move backward to the last position of the sequence; then continuing such determination for all activities in the sequence, until an complete activity sequence that meets the immediate predecessor or successor constraints is obtained, and such activity sequence is an eligible feasible solution for the project. Therefore, the initial weed population is formed by $Q_{size}$ weed individuals that generated by the above-mentioned population initialization operation and meet the eligible feasible solution.

Step 3: Executing an iteration of the weed population, and calculating the fitness value of the weed.

Multiplying the reciprocal of the objective function (1/T) by the coefficient C as the fitness function Fitness, i.e. Fitness=C/T, C is a constant, to calculate the fitness value of all weed individuals in the population.

Step 4. Calculating the number of seeds propagated by each individual weed in the population, and update the standard deviation of this iteration.

The number of seeds, weed, produced in the reproduction process of each individual weed is proportional to the fitness value f of the weed, the equation is as follows:

$$\text{weed} = \frac{f - f_{min}}{f_{max} - f_{min}}(s_{max} - s_{min}) + s_{min} \qquad (9)$$

Where $f_{max}$ is the maximum value of the fitness value of weeds in the population, and $f_{min}$ is the minimum value of the fitness value of weeds in the population;

The seeds produced by weed propagation are spread around the weeds by a normal distribution with a mean value of 0 and a standard deviation of $\sigma$. The distance between the seed and the weed is called a random step D=[$-\sigma$, $\sigma$], a varies continuously as the iteration progresses, and its equation is as follows:

$$\sigma = \frac{(iter_{max} - iter)^N}{(iter_{max})^N}(\sigma_{init} - \sigma_{final}) + \sigma_{final} \qquad (10)$$

Where, iter is the current number of executed iterations of the weed population.

Step 5: Generating seeds through weeds propagation, subsequently new weed populations are formed by merging weeds from the generated seeds with the original weed population.

Firstly, the number of seeds, weed, and the related the standard deviation normal distribution $\sigma$, that are generated by the weed propagation, are calculated by equations (9) and (10). A new position obtained in the solution is called the seed, whose position code is the seed position code, that is, the seed position code can be obtained according to the weed position code and the random step length D; then performing the same operation in the step 2, converting the seed position codes to the activity sequence, performing a right-shift decoding to make the activity sequence become the eligibly feasible solution, thereby the seed grows into a weed; in the meantime, the seed position code becomes a weed position code, this code, together with the activity sequence after the right-shift decoding, constitute the first and second code layers for a new individual weed; lastly merging all weeds from the seeds with the original weed population to obtain a new weed population.

Step 6. Adjusting whether the size of the weed population is greater than $Q_{max}$. If so, go to step 7; otherwise, go to step 3.

Step 7. Calculating the fitness value of the weeds in the population and selecting $Q_{size}$ individuals pursuant to the principle of "struggle for existence".

With the propagation of weeds, when the size of weed population exceeds the capacity of the environment, it is necessary to determine the maximum size of weed population in order to restrict the propagation of weeds, and retain elite weed individuals while eliminate the others through the criteria of survival of the fittest, then select $Q_{size}$ weed individuals having high fitness value to form a new population.

Step 8. Determining whether the number of iterations equal to $iter_{max}$. If so, output the optimal solution and end the calculation; otherwise, go to step 3 to execute a new iteration process.

3. Conducting numerical experiments and result analysis.

Performing numerical experiments using Matlab2014b platform, utilizing IWO to get a solution for the resource-constrained project scheduling problem in the PSPLIB, and comparing the solution with the current optimal solution and the solution by Genetic Algorithm (GA). Calculating 10 times in each working condition, and recording the optimal solution (Upper Boundary, UB), the worst solution (Lower Boundary, LB) and the average value of the 10 calculation results. The experimental results are shown in Table 1, where opt is the current optimal solution in the PSPLIB, and GAP is the difference percentage between the two algorithms.

$$GAP = \frac{T_1 - T_2}{T_2} \times 100\%$$

In this equation, $T_1$ is the average of the total duration obtained by GA, and $T_2$ is the average of the total duration obtained by IWO.

TABLE 1

Experimental results at 4 scales

| | | | IWO | | | GA | | | |
|---|---|---|---|---|---|---|---|---|---|
| Scale | Number | opt | UB | LB | average | UB | LB | average | GAP/% |
| 30 | 1 | 43 | 43 | 43 | 43 | 43 | 43 | 43 | 0 |
| | 2 | 47 | 47 | 47 | 47 | 47 | 47 | 47 | 0 |
| | 3 | 51 | 51 | 51 | 51 | 51 | 51 | 51 | 0 |
| | 4 | 62 | 62 | 62 | 62 | 62 | 62 | 62 | 0 |
| | 5 | 39 | 39 | 39 | 39 | 39 | 39 | 39 | 0 |
| 60 | 1 | 77 | 77 | 80 | 78.5 | 77 | 85 | 80.2 | 2.17 |
| | 2 | 68 | 68 | 68 | 68 | 68 | 68 | 68 | 0 |
| | 3 | 76 | 76 | 79 | 77.1 | 76 | 79 | 77.8 | 0.91 |
| | 4 | 91 | 91 | 97 | 93.6 | 91 | 97 | 95.2 | 1.71 |
| | 5 | 73 | 73 | 76 | 73.9 | 73 | 76 | 74.6 | 0.95 |
| 90 | 1 | 66 | 66 | 74 | 67.2 | 66 | 74 | 69.3 | 3.13 |
| | 2 | 92 | 92 | 100 | 95.7 | 92 | 104 | 99.1 | 3.55 |
| | 3 | 73 | 73 | 80 | 76.7 | 73 | 80 | 78.5 | 2.35 |

TABLE 1-continued

Experimental results at 4 scales

| | | | IWO | | | GA | | | |
|---|---|---|---|---|---|---|---|---|---|
| Scale | Number | opt | UB | LB | average | UB | LB | average | GAP/% |
| | 4 | 86 | 86 | 97 | 90.4 | 86 | 101 | 93.6 | 3.54 |
| | 5 | 87 | 87 | 98 | 91.9 | 87 | 98 | 94.0 | 2.29 |
| 120 | 1 | 105 | 105 | 125 | 116.8 | 116 | 128 | 122.1 | 4.54 |
| | 2 | 109 | 109 | 126 | 119.7 | 118 | 128 | 125.5 | 4.85 |
| | 3 | 125 | 125 | 136 | 129.3 | 125 | 136 | 133.6 | 3.33 |
| | 4 | 97 | 97 | 111 | 107.0 | 108 | 120 | 113.9 | 6.45 |
| | 5 | 112 | 112 | 124 | 117.6 | 112 | 129 | 123.9 | 5.36 |

The experimental results show that IWO found the optimal solution in 10 operations at 4 scales. Compared with GA solution, the results by the two algorithms at scale 30 all reach the optimal solution. With the increase of scale, the IWO solution is gradually better than GA solution, the difference of the mean value in 10 operations is gradually increased, for example, the average difference percentage (based on the GAP in the above table) at scale 60 is 1.15%, the one at scale 90 is 2.97%, the one at scale 120 is 4.91%, and the GA solution at the scale 120 cannot guarantee that the optimal solution is reached within 10 operations. It can be seen that method for scheduling resource-constrained project by IWO, proposed in this application, is effective, especially, with the increase of project size, the optimization effect of the algorithm is more significant.

What is claimed is:

1. A method for scheduling resource-constrained project by Invasive Weed Optimization (IWO), comprising the following processes:
1) supposing a project being comprised of a set of activities J={0, 1, 2, . . . , n+1}, wherein the activities 0 and n+1 in this set are dummy activities, and represent the beginning and end of the project only without relating to the time and resources; j denotes a certain activity in the set, apart from the dummy activities, j∈ J, $P_j$ denotes a set of immediate predecessor activities of j, and $S_j$ denotes a set of immediate successor activities of j; $t_j$ denotes the time duration of activity j, $st_j$ denotes the start time of the activity j; the project requires k kinds of resources, q denotes one of these resources, $r_{jq}$ denotes the demand amount for the resource q in unit time in the activity j, $b_q$ is maximum supply of the resource q in unit time; the time duration of project can be discretized, e.g. d={1, 2, . . . , T} where d is the timing of the discretized time duration, and T is the total time period of project; $A_d=\{j|st_j<d\le st_j+t_j\}$ where $A_d$ is the set of activities that are being executed at the timing d;

building up the mathematical model for optimizing the resource-constrained project scheduling can be established below on the basis of the above assumption;

$$\min T = st_{n+1} \quad (1)$$

$$x_{jd} = \begin{cases} 1, \text{activity } j \text{ is in an action state at timing } d \\ 0, \text{activity } j \text{ is in an inaction state at timing } d \end{cases} \quad (2)$$

$$\sum_{d=1}^{T} x_{jd} = t_j, \forall j \in J \quad (3)$$

-continued $$t_j x_{jd} - t_j x_{j(d+1)} + \sum_{i=d+2}^{T} x_{ji} \le t_j, \forall j \in J, \forall d \in [1, 2, \ldots, T] \quad (4)$$

$$t_0 = t_{n+1} = 0 \quad (5)$$

$$r_{0q} = r_{(n+1)q} = 0, q = 1, 2, \ldots, k \quad (6)$$

$$st_i + t_i \le st_j, \forall i \in P_j, \forall j \in J \quad (7)$$

$$\sum_{j \in A_d} r_{jp} \le b_q, q = 1, 2, \ldots, k, \forall j \in J, \forall d \in [1, 2, \ldots, T] \quad (8)$$

Where

Equation (1) is the objective function, i.e. the minimized time period of project;

Equation (2) is the decision variable;

Equation (3) expresses that each activity must be completed within a specified duration;

Equation (4) expresses that, once activity j started, it cannot be interrupted before completion;

Equations (5) and (6) express that the duration and resource demand are zero in the dummy activities 0 and n+1;

Equation (7) expresses the immediate predecessor/successor constraints, activity j can be initiated after all of these immediate predecessor activities were completed;

Equation (8) expresses a resource constraint, and the demand for a certain resource in all activities being running at the timing d is no more than the maximum supply of the resource in unit time;

2) optimizing the solution by IWO in the following steps:

Step 1: Setting parameters:

Setting initial population size $Q_{size}$, maximum population number $Q_{max}$, maximum seed number $S_{max}$, minimum seed number $S_{min}$, initial standard deviation $\sigma_{init}$, final standard deviation $\sigma_{final}$, maximum iteration number $iter_{max}$ and non-linear harmonic index N;

Step 2: Initializing population:

Initializing the weed population, wherein each individual weed includes a first code layer and a second code layer; the first code includes n+1 decimals between 0 and 1 that are generated randomly, to form a position code denoting the position of the weed; the second code layer includes a plurality of numbers denoting the sequence of activities, where each number corresponds to the sequence position of each decimal, as all the decimals are sequenced from small to large, such that all of these numbers become an activity sequence; the process of converting the position code in the first code layer to the activity sequence in the second code layer is called a conversion; each activity sequence, which corresponds to an individual weed, is a feasible solution for project scheduling, and its corresponding position code in the first code layer denotes the position of the feasible solution; meanwhile, as there are the immediate predecessor/successor constraints between the project activities, it is necessary to adjust the generated activity sequence through the right-shift decoding strategy, to make it become the eligibly feasible solution in compliance with the immediate predecessor/successor constraints, using the following ways:

Starting from the first position on the activity sequence, determine whether there is an immediate predecessor activity in the sequence after the activity; if not, it means that the immediate predecessor/successor activities have ended, thereby this activity can be initiated, and the position denoted by the sequence number in the activity sequence is unchanged; if there is an immediate predecessor activity in the sequence after this activity, it means that the immediate predecessor activities of this activity have not yet ended, thereby this activity cannot be initiated, and its sequence number needs to move backward to the last position of the sequence; then continuing such determination for all activities in the sequence, until an complete activity sequence that meets the immediate predecessor or successor constraints is obtained, and such activity sequence is an eligible feasible solution for the project; the initial weed population is formed by $Q_{size}$ weed individuals that generated by the population initialization and meet the eligible feasible solution;

Step 3: Executing an iteration of the weed population, and calculating the fitness value of the weed;

Multiplying the reciprocal of the objective function (1/T) by the coefficient C as the fitness function Fitness, i.e. Fitness=C T, C is a constant, to calculate the fitness value of all weed individuals in the population;

Step 4. Calculating the number of seeds propagated by each individual weed in the population, and updating the standard deviation of this iteration;

the number of seeds, weed, produced in the reproduction process of each individual weed is proportional to the fitness value f of the weed, the equation is as follows:

$$weed = \frac{f - f_{min}}{f_{max} - f_{min}}(s_{max} - s_{min}) + s_{min} \quad (9)$$

Where $f_{max}$ is the maximum value of the fitness value of weeds in the population, and $f_{min}$ is the minimum value of the fitness value of weeds in the population;

The seeds produced by weed propagation are spread around the weeds by a normal distribution with a mean value of 0 and a standard deviation of $\sigma$; The distance between the seed and the weed is called a random step D=[$-\sigma$, $\sigma$], a varies continuously as the iteration progresses, and its equation is as follows:

$$\sigma = \frac{(iter_{max} - iter)^N}{(iter_{max})^N}(\sigma_{init} - \sigma_{final}) + \sigma_{final} \quad (10)$$

Where, iter is the current number of executed iterations of the weed population;

Step 5: Generating seeds through weeds propagation, subsequently new weed populations are formed by merging weeds from the generated seeds with the original weed population:

firstly the number of seeds, weed, and the related the standard deviation normal distribution $\sigma$, that are generated by the weed propagation, are calculated by equations (9) and (10); a new position obtained in the solution is called the seed, whose position code is the seed position code, that is, the seed position code can be obtained according to the weed position code and the random step length D; then performing the same operation in the step 2, converting the seed position codes to the activity sequence, performing a right-shift decoding to make the activity sequence become the eligibly feasible solution, thereby the seed grows into a weed; in the meantime, the seed position code becomes a weed position code, this code, together with the sequence of activities after the right-shift decoding, constitute the first and second code layers for a new individual weed; lastly merging all weeds from the seeds with the original weed population to obtain a new weed population;

Step 6. Adjusting whether the size of the weed population is greater than $Q_{max}$; if so, go to step 7; otherwise, go to step 3;

Step 7. Calculating the fitness value of the weeds in the population and selecting $Q_{size}$ individuals pursuant to the principle of "struggle for existence";

With the propagation of weeds, when the size of weed population exceeds the capacity of the environment, it is necessary to determine the maximum size of weed population in order to restrict the propagation of weeds, and retain elite weed individuals while eliminate the others through the criteria of survival of the fittest, then select $Q_{size}$ weed individuals having high fitness value to form a new population;

Step 8. Determining whether the number of iterations equal to $iter_{max}$; if so, output the optimal solution and end the calculation; otherwise, go to step 3 to execute a new iteration process.

\* \* \* \* \*